April 19, 1966   E. A. SHINER ETAL   3,247,037
PUNCTURE SEAL
Filed June 23, 1964
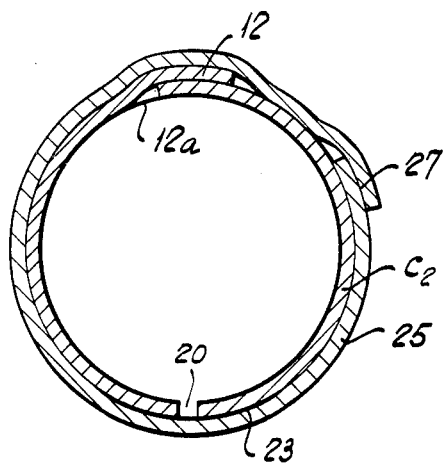
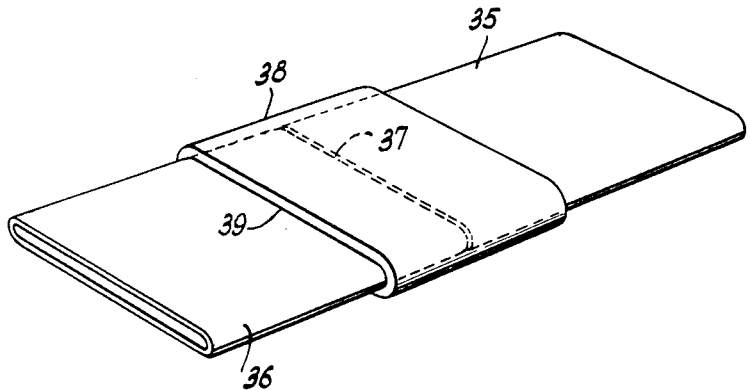
INVENTORS
WILLIAM F. UNDERWOOD
EDWARD A. SHINER
GEORGE W. WILLITS
BY Sheldon H Parker
ATTORNEY 3,247,037
PUNCTURE SEAL
Edward A. Shiner, Chicago, William F. Underwood, Oak Park, and George W. Willits, Glen Ellyn, Ill., assignors to Union Carbide Corporation, a corporation of New York
Filed June 23, 1964, Ser. No. 377,335
12 Claims. (Cl. 156—94)

This invention relates to sealing regenerated cellulosic materials. More particularly, it relates to a method of sealing wet or gell cellulosic sausage casings.

This application is a continuation-in-part of Serial No. 799,401, filed March 3, 1959, and now abandoned.

In the manufacture of continuous seamless regenerated cellulosic sausage casings by the viscose process, such as is described in U.S. 1,908,892 to Dietrich et al., a tubular casing is formed by continuously extruding viscose through an annular nozzle into an aquarium containing a mixture of sulfuric acid and sodium sulfate or equivalent regenerating agents. The viscose, as it passes through the aquarium, is coagulated and partially regenerated. During this step, gases are evolved and are entrapped within the tubular casing. In order to effect a release of these gases, the casing is punctured by cutting longitudinally through the surface of the gas inflated casing, producing a slit type opening.

The casing thereafter continues through the regeneration, desulfuring, wash and glycerinization baths. The casing is then dried in the inflated state by entrapping a bubble of air between two sets of squeeze rolls, maintained at the entrance and exit of a hot air drier. In order to effect continuous inflation for drying, the casing must be free of any punctures.

Accordingly, it has been the practice to cut out that section of casing containing the puncture prior to its entrance into the drier. The cut ends of the casing were then connected together in such a manner as to allow for the continuous passage of air through the interior of the tubing. The connection was formed by inserting into a cut end of the casing a short, flexible rubber tube. The other cut end of casing was slipped over the first end containing the tubular insert and the two ends were held together on the rubber tube as by circumferentially winding and knotting a piece of string over the telescoped cut sections. The rubber tube insert permitted free passage of air within the casing as it passed through the drier, thus providing a bubble for inflating the tube during the drying operation, said bubble being continuously maintained by the aforedescribed squeeze rolls.

A disadvantage in using a tubular insert to effect closure of a punctured casing is in the amount of casing which is wasted. A further disadvantage in the case of frankfurter casing which is shirred as by pleating to form a compressed stick of convenient size for stuffing operations lies in the fact that the section of casing carrying the puncture cannot pass over the shirring mandrel of the shirring apparatus and the casing cannot be shirred continuously. Moreover, since the cellulosic casing is reeled as a flattened tubing after drying, the presence of a tubular insert causes much wrinkling of the casing on the reel. Another disadvantage is in the time involved in effecting this closure and its subsequent removal. Further, when the casing is printed, the tubular insert cannot pass through the printing press readily.

Bonding or laminating dry regenerated cellulose to itself or other materials by use of an adhesive when the cellulose is dry is known. However, attempts to seal a puncture in wet regenerated cellulose seamless tubing by either coating the puncture with a film-forming material or using an adhesive have not previously been successful. Adhesive materials, such as animal and vegetable glues, viscose, rubber adhesives, and other polymeric compositions, do not bond sufficiently and rapidly enough to wet regenerated cellulose to form a seal resistant to the inflating air pressure and the shear forces which occur when the wet cellulosic tubing is dried in the inflated state.

The failure of such adhesives or coatings to perform satisfactorily can be accounted for by the extremely high moisture content of the regenerated cellulose casings immediately prior to drying. Typically the casings after passing through the several water washes and aqueous glycerine and after being wiped as by doctor blades to remove surface water, contains from about 60 to about 80 percent by weight of water. Such large amounts of water in the case of the water-soluble animal or vegetable glues and viscose cause dilution of the glue and resultant weak bonds. In the instance of the rubber adhesives, the water content of the wet casing inhibits wetting of the regenerated cellulose surface by the water-insoluble rubber adhesive.

Accordingly, it is an object of this invention to provide a method of sealing punctures in gel regenerated cellulosic casings.

Another object of the present invention is to seal punctures in wet regenerated cellulosic tubular casing with a seal capable of retaining the inflating air in the casing and resistant to the shearing forces encountered during drying of the wet casing in the inflated state.

A further object of the present invention is to provide a seal over punctured areas in wet regenerated tubular cellulosic casings, said seal substantially conforming to the shape of the wet casing.

Another object of the present invention is to provide a seal over punctured areas in wet regenerated cellulosic tubing, said seal after drying of the casing causing little or no wrinkling in lay-flat reeling of the dried casing, said seal passing readily through printing presses in the printing of the casing and over shirring mandrels of shirring apparatus.

Another object is the sealing of punctured areas in wet regenerated cellulosic tubing with sealing material producing an effective seal with little or no interruption to the continuous manufacture of such tubing.

The accomplishment of the above objects and others will be made evident as the description of the invention proceeds.

According to the present invention, punctured areas such as holes, rips, or tears in wet or moisture-containing regenerated cellulosic tubing or casing can be quickly and securely converted to form a substantially air-tight seal highly resistant to peeling during drying of the casing by pressure applying over such area of the casing a patch of flexible material and adhesively securing said patch to the cellulosic surface essentially by means of a water-soluble polyvinyl alcohol.

The patch can comprise a sheet of flexible material such as paper, cotton cloth, regenerated cellulosic film (cellophane) having a coating of water-soluble polyvinyl alcohol, or alternatively, the area surrounding the puncture can be coated with water-soluble polyvinyl alcohol and the patch with or without its own coating of polyvinyl alcohol thereafter applied to the coated areas of the casing. Furthermore, the patch can consist wholly of a self-supporting, dry film of water-soluble polyvinyl alcohol or sufficient strength and thickness to withstand the shear forces occurring during drying of the casing. Water-soluble polyvinyl alcohol film of 3 to 4 mils thickness have been used successfully.

A critical requirement to obtain a seal with water-soluble polyvinyl alcohol resistance to inflating gas pressure is the presence of moisture in the sealing system when the seal is made. Ordinarily, wet-regenerated cellulose casing, prior to being dried, contains from about 60 to 80 percent by weight of water, and such water content is sufficient to activate a patch having a dry surface of polyvinyl alcohol and form an adhesive gas tight bond at ambient temperatures upon the application of pressure, e.g. as of a hand iron for about 3 to 8 minutes. On the other hand, a regenerated cellulose casing which has been dried to a moisture content less than about 30 percent by weight does not form a gas tight bond to a dry polyvinyl alcohol surface at ambient temperatures and under the same pressure.

Suitable moisture conditions for activating the polyvinyl alcohol surface can also be provided by applying an aqueous solution of polyvinyl alcohol either to the patch or to the surface of the casing surrounding the ruptured area, and before the coating has dried to a non-tacky state, pressure applying the patch to the casing, and permitting the patch to dry at ambient temperatures for about 4 to 8 minutes before inflating and drying the casing to a moisture content of less than about 20 percent by weight.

In either instance, that of a dry polyvinyl alcohol surface or of wet polyvinyl alcohol surface, the time for forming a gas tight seal can be materially reduced by heating the patch and the casing during application of pressure. Typically using a hand iron having automatic temperature control to effect an iron surface temperature of 210° F. to 215° F. to pressure apply a patch having a dried coating of polyvinyl alcohol to cover the punctured area of a wet-regenerated cellulose casing (75 percent moisture content), a gas tight seal formed within 30 seconds. The same order of sealing speed was obtained in applying a patch of dry regenerated cellulose film to a wet regenerated cellulose casing having an undried coating of an aqueous polyvinyl alcohol solution on the area around the puncture.

Higher sealing temperatures can be used providing precautions are taken to avoid blistering of the polyvinyl alcohol. For example, at an iron temperature of 330° F. to 360° F., blistering can be minimized by having the heated iron contact the casing side opposite to where the patch has been applied.

For purposes of coating the punctured wet casings or of the patches to be applied thereto, aqueous solutions of 10 to 16 percent by weight polyvinyl alcohol have been satisfactorily used, and a preferred amount is 13 percent. However, since polyvinyl alcohols come in varying viscosities and degrees of hydrolysis, the percentages are not limited thereunto and optimum results for particular working conditions can easily be determined by those in the art. Above a 16 percent by weight concentration of polyvinyl alcohol the solutions tend to gel, making them difficult to apply smoothly to the casings. Below a 10 percent concentration of polyvinyl alcohol, satisfactory sealing is difficult to obtain because of low solids content of polyvinyl alcohol in solution.

The invention will be further understood by reference to the accompanying drawing wherein:

FIGURE 1 is a cross-sectional view of a reinforced seamless matrix tube 12 of paper bonded to form overlap 12a and impregnated with regenerated cellulose as produced according to U.S. 2,144,900 and having a puncture 20 covered by a circumferentially wrapped pellicle 25 with an overlap 27 and being adhesively secured to tube 12 by a coating of water-soluble polyvinyl alcohol 23;

FIGURE 2 is a perspective view of two cut ends of regenerated cellulose casing butt joined together with an adherent heat and pressure applied overwrapping of regenerated cellulose film having a water-soluble polyvinyl alcohol film coating the thicknesses of the casing and overwrapping being somewhat exaggerated for purposes of clarity.

The drawing is further described with reference to the subsequent examples which illustrate further the novelty and utility of the invention. The invention is not limited, however, to said examples except as defined in the appended claims.

*Example 1*

A reinforced seamless cellulosic matrix tube of 10 inch circumference was continuously produced according to the method described in United States Patent 2,144,900 by viscose coating and forming a tube progressively from paper and passing the coated tube through a coagulating and precipitating bath to regenerate the viscose. Gases generated within the casing during passage of the tube through the regenerating baths were vented from the tube by periodically slitting the tube with a slit approximately six inches in length and substantially in the machine direction as illustrated in FIGURE 1. The punctured casing was washed and glycerinated in a continuous manner. At this point the casing is called gel casing (never dried).

As shown in FIGURE 1, the puncture 20 in the casing 12 was sealed by applying a coating 23 of a 13 percent by weight solution of polyvinyl alcohol, as by brushing, to the entire circumference of the external casing area adjacent to the puncture 20 and for several inches therealong. (The polyvinyl alcohol was "Elvanol 72–51" marketed by the E. I. du Pont de Nemours Co., and having a viscosity of 45–55 centipoises as measured in a 4 percent water solution at 20° C. by means of the Hoeppler falling ball method and percent hydrolysis of 97.9–98.7).

A piece of regenerated cellulose film 25 having a width somewhat greater than the circumference of the casing 12 and a length somewhat longer than the length of the puncture 20 was manually wrapped around the casing covering the puncture 20 in a manner which insured an overlap 27 of the reinforcing pellicle 25 around the circumference of the casing 12. The pellicle 25 was hand pressed onto the casing 12 to assure intimate contact and to prevent any substantial dimensional changes in the casing's diameter or circumference. A gas tight seal was obtained in less than five minutes drying time at 25° C.

The sealed gel casing was then dried in the inflated state by passing it through a hot air drier. Two sets of squeeze rolls, one at the entrance and one at the exit end of the drier, were used to maintain a continuous isolated bubble of air in the casing. The bubble of air continuously inflated successive portions of the casing entering the drier.

The portion of the casing containing the puncture was successfully dried without loss of air in the bubble. The air pressure in the bubble was between 3 and 12 pounds per square inch gage pressure, resulting in continuous dried casing of uniform diameter. The casing was continuously reeled in the flattened condition and no wrinkling was observed. Applying a stretch burst test to the dried casing using the apparatus described in United States Patent 1,978,134, the casing would burst before any rupture occurred in the pellicle sealed portion thereof.

*Example 2*

A regenerated fibrous reinforced cellulosic casing was made as described in example, and punctured to remove gases. The puncture in the gel casing was sealed as follows: A pellicle was made from a film of regenerated cellulose coated on one side with a 13 percent by weight solution of polyvinyl alcohol in water and then dried. The dried polyvinyl alcohol coated reinforcing film was then placed on the flattened gel casing and covered the punctured area. The polyvinyl alcohol coated side of the reinforcing film was placed in contact with the gel casing. Heat and pressure were directly applied to the pellicle to effect a seal. A "hand iron" having a surface temperature of 210° F. to 215° F. was used to supply the heat and pressure. The sealed casing was then continuously dried in the inflated state, flattened, and reeled.

The casing diameter remained substantially constant and the casing was wrinkle-free on the reel and could be readily printed.

In that embodiment wherein a polyvinyl alcohol coated cellulosic sheet is placed over the puncture and the sheet applied by the application of heat and pressure, the polyvinyl alcohol-coated cellulosic sheets can be obtained and conveniently prepared in advance by internally passing an aqueous polyvinyl alcohol solution through a seamless regenerated cellulosic casing and thereafter drying the deposited polyvinyl alcohol film by heating the casing in the inflated state to temperatures of about 110° C.–130° C. The coated casing is cut to form sheets and placed over the puncture and applied as hereinbefore described. Other reinforcing backing material, such as paper and fabrics, may be similarly coated with polyvinyl alcohol film.

The amount of heat and pressure applied to secure the polyvinyl alcohol coated cellulosic sheet to the casing is such as to not adversely affect the casing. The heat and pressure can be applied directly over the patch or to the opposite side of the casing. Temperatures of the heating iron of 210° F.–215° F. have given satisfactory results when applied directly to the patch. Temperatures of 330° F.–360° F. have been satisfactorily used when applied to the opposite side of the casing. Too high temperatures when applied directly to the patch create blister formation due to the formation of vapor pockets and thus produce poor seals. The amount of heat and pressure needed for optimum results can be determined by empirical tests.

The principles of this invention may also be used for the purpose of butting two pieces of casing to each other as shown in the subsequent example.

*Example 3*

Occasionally in the continuous process for making cellulose casing by the viscose process, complete severance of the casing while in the wet condition may occur. The wet severed casing can be quickly rejoined with a polyvinyl alcohol coated pellicle as illustrated in FIGURE 2. The severed ends of the wet casings are cut off square and held in butted end-to-end relationship 37 while a pellicle strip of regenerated cellulose film 38 having a dried coating of polyvinyl alcohol 39 and of a length more than twice the flat width of the casings to enable an overlapping seam to be formed is encircled around the butted casing ends, the coated side of the pellicle being continuous to the surfaces of the severed casings. A gas-proof joint was obtained by subjecting the joint to pressure of a hand iron having a surface temperature of 210° F. The wet casing after being thus heat-sealed was then dried satisfactorily by the entrapped air bubble method previously described.

Polyvinyl alcohol films per se can be used without a reinforcing backing material provided that it is of sufficient strength and thickness to withstand the shear forces occurring in the drying operation. Films 3–4 mils in thickness have been used successfully.

The polyvinyl alcohol film is applied to the puncture area by means of heat and pressure in the same manner as the polyvinyl alcohol-coated reinforcing pellicle is applied, except that a slip sheet of a non-adhering material such as polyethylene terephthalate film is used to prevent the polyvinyl alcohol film from sticking to the heating and pressure means. It is preferred that the polyvinyl alcohol film be plasticized with glycerine to give it the desired degree of flexibility to follow the contour of the inflated tube for most effective operation. A glycerine content of about 10 to 20 percent by weight of the polyvinyl alcohol imparts adequate flexibility for the sealed regenerated cellulosic casing to be flexed about conveyor pulleys or be otherwise mechanically manipulated in the manner to which cellulosic sausage casings are ordinarily subjected without cracking or rupture of the polyvinyl alcohol film.

The method for applying the heat and pressure to effect the seal is not critical. Any number of methods can be used, such as an automatic or hydraulic press, or manually, such as by use of a tailor's iron.

Furthermore, to aid in identifying the seals of this invention during the shirring and cutting operations, the cellulosic sheets used as seals can be of a different color than the casing being sealed.

The methods of this invention can be used on any gel or wet cellulosic film gel, or wet cellulosic sausage casing, such as used for frankfurters, salami, bologna, and regenerated cellulosic sausage casing having a paper web embedded therein.

Although regenerated cellulose has been shown to be made by the viscose process, it is obvious that the invention can also be used on wet regenerated cellulose made by other processes such as denitration of nitrocellulose, deacetylation of cellulose acetate, and on modified cellulosic film.

While several embodiments of the invention have been shown and described, it will be readily understood by those skilled in the art that various changes and arrangements may be made without departing from the spirit and nature of the invention.

What is claimed is:

1. In the manufacture of tubular casings from a cellulose derivative, a process which comprises continuously forming a tubular casing containing the cellulose derivative, regenerating the cellulose derivative therein by passage of the casing through an aqueous regeneration bath to form wet gel casing, puncturing the gel casing to vent gases formed within the casing during regeneration, covering the puncture and an external area of the casing immediately adjacent to the puncture with a flexible pellicle, sealing said pellicle to the casing with a water-soluble polyvinyl alcohol and then drying the sealed casing in an inflated state.

2. Method according to claim 1 wherein the external casing area about the puncture is coated with an aqueous solution of water-soluble polyvinyl alcohol and the pellicle is applied to the coated area before the coating has dried.

3. Method according to claim 1 wherein the pellicle has at least one surface of water-soluble polyvinyl alcohol, and said surface is brought into pressure contact with the casing.

4. Method according to claim 1 wherein the pellicle is a self-supporting film of water-soluble polyvinyl alcohol.

5. Method according to claim 1 wherein the pellicle, has a dry coating of water-soluble polyvinyl alcohol on at least one of its surfaces and said coated surface is brought into contact with the casing under heat and pressure.

6. Method according to claim 1 wherein the cellulose derivative is viscose and is extruded through an annular orifice to form tubular casing.

7. Method according to claim 1 wherein the casing is formed by impregnating and coating with viscose paper strip formed into a tube with over lapping longitudinal margins.

8. In a method according to claim 1 wherein the pellicle is a film or regenerated cellulose.

9. In the manufacture of tubular casings from viscose, a process which comprises continuously forming the viscose into tubular casing, regenerating the viscose in the casing by passage of the casing through an aqueous regeneration bath to form gel regenerated cellulose, puncturing the regenerated gel casing to vent gases formed within the casing during regeneration, washing the gel casing, then plasticizing the casing by passage through an aqueous solution of glycerol, covering the puncture and an external area of the casing immediately adjacent to the puncture with a flexible pellicle, sealing said pellicle to the casing with a water-soluble polyvinyl alcohol and then drying the sealed casing in an inflated state.

10. In the manufacture of tubular casings from a cellulose derivative, the process which comprises continuously forming a tubular casing containing the cellulose derivative, regenerating the cellulose derivative therein by passage of the casing through an aqueous regeneration bath to form wet gel casings, puncturing the gel casing to vent gases formed within the casing during regenerating, completely severing the punctured portion of the gel casing from the remaining portions of the casing, butting together the severed ends of the gel casing, wrapping a flexible pellicle around the butted ends, sealing said pellicle to the casing with a water soluble polyvinyl alcohol and then drying the sealed casing in an inflated state.

11. In the manufacture of tubular casings from viscose, a process which comprises continuously forming the viscose into tubular casing, regenerating the viscose casing by passage of the casing through an aqueous regeneration bath to form gel regenerated cellulose, puncturing the regenerated gel casing to vent gases formed within the casing during regeneration, washing the gel casing, plasticizing the casing by passage through an aqueous solution of glycerol, severing the punctured portion of the casing from the remaining portion of the casing, butting the severed ends of the casting together, wrapping a flexible pellicle around the butted ends, sealing said pellicle to the casing with a water-soluble polyvinyl alcohol and then drying the sealed casing in an inflated state.

12. Method according to claim 11 wherein the pellicle has a dry coating of water-soluble polyvinyl alcohol on at least one of its surfaces and said coated surface is brought into contact with the casing under heat and pressure.

References Cited by the Examiner

UNITED STATES PATENTS

| | | | |
|---|---|---|---|
| 1,612,509 | 12/1926 | Henderson et al. | 264—95 |
| 2,101,607 | 12/1937 | Block | 156—94 |
| 2,160,371 | 5/1939 | Schnabel | 156—294 |
| 2,161,561 | 6/1939 | Dalton | 215—38 |
| 2,351,404 | 6/1944 | Colley | 156—552 |
| 2,372,982 | 4/1945 | Richards et al. | 117—6 |
| 2,384,462 | 9/1945 | Goodman | 161—142 |
| 2,399,338 | 4/1946 | Ford | 156—299 |
| 2,413,570 | 12/1946 | Krister et al. | 156—314 |
| 2,430,076 | 11/1947 | Pollock | 156—97 |
| 2,430,630 | 11/1947 | Davis | 156—128 |
| 2,524,960 | 10/1950 | Cottet et al. | 161—206 |
| 2,653,432 | 9/1953 | Wright et al. | 156—203 |

FOREIGN PATENTS 464,929    11/1938    Great Britain.

OTHER REFERENCES

Delmonte: The Technology of Adhesives, 1947, pp. 128 and 129, Reinhold Publ. Corp., New York, N.Y.

EARL M. BERGERT, *Primary Examiner.*